(No Model.)

C. G. PFINGSTER & E. YOUNG.
HANDLE FOR POCKET BOOKS, &c.

No. 258,112. Patented May 16, 1882.

Witnesses
Otto Hufeland
William Miller

Inventors
Carl Gustav Pfingster
Edwin Young

UNITED STATES PATENT OFFICE.

CARL G. PFINGSTEN AND EDWIN YOUNG, OF NEW YORK, N. Y., ASSIGNORS TO SAID YOUNG.

HANDLE FOR POCKET-BOOKS, &c.

SPECIFICATION forming part of Letters Patent No. 258,112, dated May 16, 1882.

Application filed October 21, 1880. (No model.)

*To all whom it may concern:*

Be it known that we, CARL GUSTAV PFINGSTEN and EDWIN YOUNG, said CARL GUSTAV PFINGSTEN being a citizen of the German Empire, and said EDWIN YOUNG being a citizen of the United States, both residing at New York, in the county and State of New York, have invented new and useful Improvements in Handles for Book-Holders, Pocket-Books, Satchels, and similar articles, of which the following is a specification.

This invention consists in the combination, with a book-holder, pocket-book, satchel, or similar article, of a handle pivoted to the book-holder, pocket-book, satchel, or similar article at its opposite ends, and adapted to swing beneath and be held in frictional contact with the lower edge thereof, so that when the handle is swung up the book-holder or other article can be conveniently carried in the hand, and when the handle is swung down said book-holder or other article can be conveniently carried in the pocket; also, in the combination, with the handle and with the book-holder, pocket-book, or other similar article, of two loops which engage with the handle and are fastened in the ends of the book-holder, pocket-book, or other similar article, and adapted to swivel in said ends, so that the handle can be conveniently swung up or down. The handle slides in the loops, so that when it is swung down it can be pushed close up to the bottom of the book-holder or other article.

In the example shown in the accompanying drawings we have represented a book-holder; but it is obvious that our invention is applicable to other articles of a similar nature, such as satchels and pocket-books.

Figure 1:
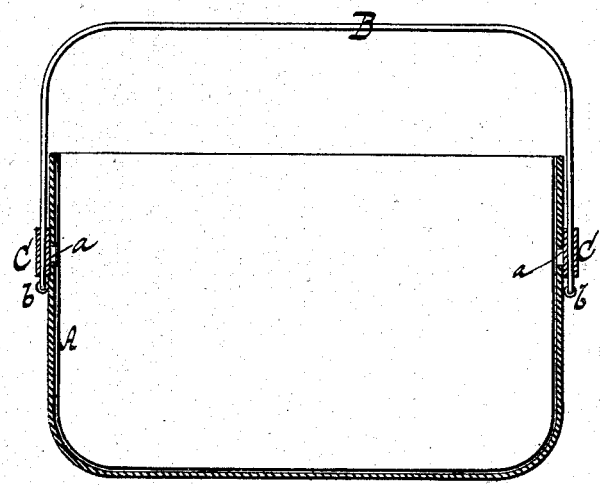
Figure 2:
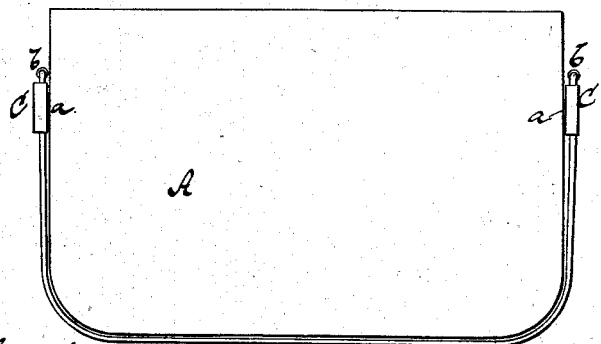

In the drawings, Figure 1 represents a longitudinal vertical section when the handle is swung up. Fig. 2 is a side view when the handle is swung down.

Similar letters indicate corresponding parts.

The letter A designates a book-holder, which may be made of any suitable material and of any convenient size, according to the nature of the books to be carried. To the opposite ends of this book-holder is secured a handle, B, so that it can swing up to the position shown in Fig. 1 or swing down to the position shown in Fig. 2. To effect this purpose the handle may be pivoted directly to the ends of the book-holder, or pivots may be firmly secured in the book-holder and the handle made to swing on these pivots; but I prefer to secure to the opposite ends of the book-holder loops C, which swivel on pivots $a$, and which form guides for the handle B, said handle being provided at its ends with stops $b$ for preventing said ends from sliding through the loops. The advantage of this arrangement is that the handle can be swung up or down with convenience, and that when the handle is swung down it can be pushed close up to the bottom of the book-holder, so as to lie snug against it. In most cases, however, the handle will be made of such a length that the same, when swung down, will be held in frictional contact with the lower edge of the book-holder or other article to which it is attached.

What we claim as new, and desire to secure by Letters Patent, is—

1. The combination, with a book-holder, pocket-book, satchel, or similar article, of a handle pivoted to the book-holder, pocket-book, or similar article at its opposite ends, and adapted to swing beneath and be held in frictional contact with the lower edge thereof, substantially as and for the purpose shown and described.

2. The combination, with the handle and with the book-holder, pocket-book, or other similar article, of two loops which engage with the handle and swivel in the ends of the book-holder or other article, substantially as and for the purpose set forth.

3. The combination, with the swivel-loops and with the book-holder or other article to which said swivel-loops are fastened, of a handle which is adapted to slide in said swivel-loops, substantially as and for the purpose described.

In testimony whereof we have hereunto set our hands and seals in the presence of two subscribing witnesses.

CARL GUSTAV PFINGSTEN. [L. S.]
  EDWIN YOUNG. [L. S.]

Witnesses:
  W. HAUFF,
  E. F. KASTENHUBER.